United States Patent
Kaneko

(10) Patent No.: US 9,042,750 B2
(45) Date of Patent: May 26, 2015

(54) SYSTEM, SERVER, AND METHOD FOR MANAGING COMPONENT REPLACEMENT IN AN IMAGE FORMING APPARATUS

(75) Inventor: Tsuyoshi Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 408 days.

(21) Appl. No.: 13/529,699

(22) Filed: Jun. 21, 2012

(65) Prior Publication Data

US 2012/0328306 A1 Dec. 27, 2012

(30) Foreign Application Priority Data

Jun. 24, 2011 (JP) ................................. 2011-140882

(51) Int. Cl.
*G03G 21/12* (2006.01)
*G03G 15/00* (2006.01)
*G06Q 10/06* (2012.01)

(52) U.S. Cl.
CPC .... *G03G 15/556* (2013.01); *G03G 2215/00109* (2013.01); *G06Q 10/06* (2013.01); *G03G 15/5079* (2013.01); *G03G 15/553* (2013.01)

(58) Field of Classification Search
CPC .......................... G03G 15/556; G03G 15/5079
USPC .......................... 399/35, 9, 11, 12, 24, 27, 31
See application file for complete search history.

(56) References Cited

U.S. PATENT DOCUMENTS

2003/0050873 A1\* 3/2003 Niki ................................ 705/28

FOREIGN PATENT DOCUMENTS

| JP | 2003-159854 A | | 6/2003 |
|---|---|---|---|
| JP | 2010026396 A | \* | 2/2010 |

\* cited by examiner

*Primary Examiner* — Billy Lactaoen

(74) *Attorney, Agent, or Firm* — Canon USA Inc. IP Division

(57) ABSTRACT

A management server stores stock information on a toner collection box in an image forming apparatus and updates, if a notification received from the image forming apparatus indicates that the toner collection box is full or close to full, the stored stock information of the toner collection box.

9 Claims, 11 Drawing Sheets

FIG. 6

| COMPONENT PRIMARY NUMBER | COMPONENT CODE | COMPONENT NAME | COMPONENT MANAGEMENT FLAG | STOCK MANAGEMENT FLAG |
|---|---|---|---|---|
| xxxxxxxx1 | 714xxx | TONER COLLECTION BOX | R | 1 |
| xxxxxxxx2 | 715xxx | FIXING DEVICE | 0 | 1 |
| xxxxxxxx3 | 751xxx | CASSETTE SEPARATION ROLLER | 0 | 0 |

FIG. 7

| | PERIOD | NUMBER OF SHEETS |
|---|---|---|
| TONER COLLECTION BOX FULL | 3 | 1000 |
| STAPLE RUN-OUT | 30 | 500 |

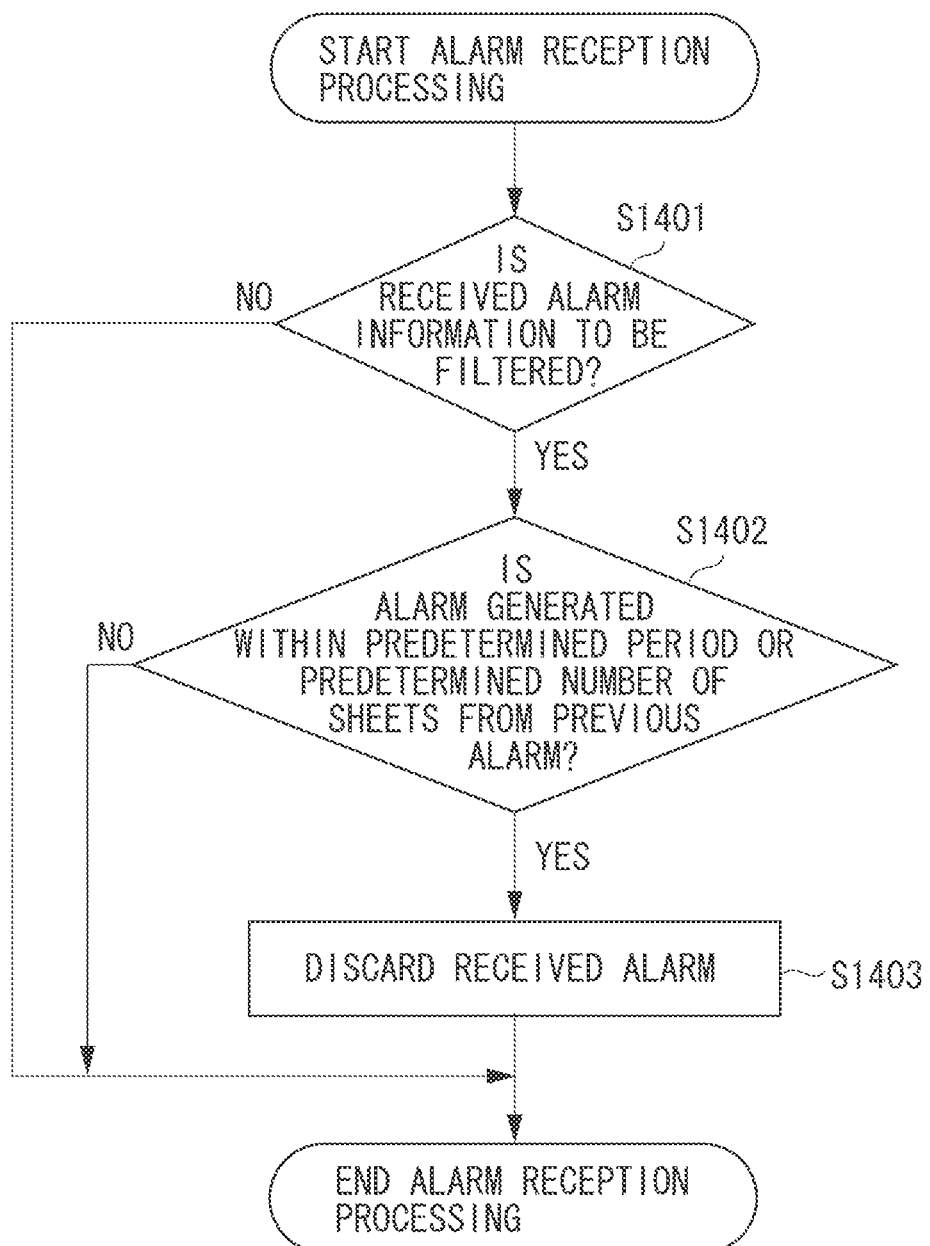

FIG. 10

DETAILS OF COMPONENT STOCK AGREEMENT

◄ RETURN

[ SAVE ]  [ DELETE ]

BASIC INFORMATION
DEVICE ID: XXX0000
DEVICE NAME: Device0001
STOCK MANAGEMENT AGREEMENT: ○ NONE ⊙ YES

COMPONENT MANAGEMENT INFORMATION
+PERSON IN CHARGE OF COMPONENT MANAGEMENT: [ ▼ ]
  +E-MAIL ADDRESS:
  PHONE NUMBER:
  CELLULAR PHONE NUMBER:
  FACSIMILE NUMBER:

*COMPONENT STOCK STORAGE LOCATION: [ STOCK-STORAGE-A ▼ ]
  +PERSON IN CHARGE:
  +E-MAIL ADDRESS:
  PHONE NUMBER:
  CELLULAR PHONE NUMBER:
  FACSIMILE NUMBER:

STOCK MANAGEMENT TARGET:

[ SELECT/CANCEL ALL ]

| | COMPONENT NUMBER | COMPONENT NAME |
|---|---|---|
| ☑ | KAISHI-01 | TONER COLLECTION BOX |

1002

DATE OF CREATION:
LAST UPDATE DATE:

UPDATE INFORMATION
CREATOR:
LAST UPDATED BY:

[ SAVE ]  [ DELETE ]

CONSUMPTION RATE OF CONSUMABLES (DEVICE - CONSUMABLES)
SALES ORGANIZATION NAME: ADM07 RIAdev_JP(ADM07)    REPORT CREATION DATE AND TIME  2011-06-14 18:30 (+09:00)
INFORMATION ON PERSON IN CHARGE ≫
RDS INFORMATION ≫                                 DEVICE INFORMATION ≫
INFORMATION ON PERSON IN CHARGE OF TONER/INK MANAGEMENT ≫   INFORMATION ON PERSON IN CHARGE OF TONER/INK
TONER/INK DELIVERY INFORMATION ≫                            STOCK STORAGE LOCATION MANAGEMENT
DEVICE ID:KOSUG1060001  PRODUCT NAME:iRC4580F  LAST TRANSMISSION DATE :2011-05-10
1 THROUGH 42 OUT OF 42

| COMPONENT CODE | SPECIAL COMPONENT | COMPONENT NUMBER | COMPONENT NAME | CONSUMPTION RATE (%) | UNITS | COMPONENT LIFE | CURRENT COUNTER VALUE | LAST REPLACEMENT DATE |
|---|---|---|---|---|---|---|---|---|
| TN-FIL1 | | FC7-4195 | Toner filter | 226.08 | NUMBER OF SHEETS | 500000 | 1130408 | 2006-11-20 |
| 2TR-INRL | | FB6-2934 | Secondary TransferRoller | 181.26 | NUMBER OF SHEETS | 300000 | 543771 | 2009-01-06 |
| PD-FD-RL | | FF5-7541 | CONVEYANCE ROLLER (DECK) | 165.99 | NUMBER OF SHEETS | 250000 | 414964 | 2006-11-20 |
| PD-PU-RL | | FF5-7829/FF5-7830 | Pickup roller(front)/Pickup roller(rear) | 165.99 | NUMBER OF SHEETS | 250000 | 414964 | 2006-11-20 |
| PD-SP-RL | | FB2-7777 | SEPARATION ROLLER (DECK) | 165.99 | NUMBER OF SHEETS | 250000 | 414964 | 2006-11-20 |
| C1-FD-RL | | FC6-6661 | Separation Roller(Cassette 1) | 121.03 | NUMBER OF SHEETS | 120000 | 145238 | 2006-11-20 |
| C1-SP-RL | | FC6-7083/FC7-9502(CN) | Feeding Roller(Cassette 1) | 121.03 | NUMBER OF SHEETS | 120000 | 145238 | 2006-11-20 |
| T-CLN-BD | | FG6-8989 | Intermediate Transfer Cleaning Unit | 66.75 | NUMBER OF SHEETS | 100000 | 66747 | 2010-12-14 |
| LNT-TAP1 | | FC5-2959 | Dust-colleting tapeA | 65.5 | NUMBER OF SHEETS | 80000 | 52400 | 2006-11-20 |
| LNT-TAP2 | | FC5-2960 | Dust-colleting tapeB | 65.5 | NUMBER OF SHEETS | 80000 | 52400 | 2006-11-20 |
| LNT-TAP3 | | FC5-2961 | Dust-colleting tapeC | 65.5 | NUMBER OF SHEETS | 80000 | 52400 | 2006-11-20 |
| LNT-TAP4 | | FC5-3016 | Dust-colleting tapeD | 65.5 | NUMBER OF SHEETS | 80000 | 52400 | 2006-11-20 |

1101

SYSTEM, SERVER, AND METHOD FOR MANAGING COMPONENT REPLACEMENT IN AN IMAGE FORMING APPARATUS

BACKGROUND OF THE INVENTION

1. Field of the Invention

The present invention relates to a technique for performing stock management of consumables in an image forming apparatus, and in particular, a toner collection box in the image forming apparatus.

2. Description of the Related Art

Conventionally, there is a management system in which a management server collects operation information, such as failure or counter information, of an image forming apparatus connected to a network. The management system thus manages the image forming apparatus by performing maintenance of the apparatus.

In such a management system, the image forming apparatus notifies, when a user has replaced a component in the image forming apparatus, the management server of a replacement of the component.

The image forming apparatus issues such a notification by causing the user to select, on a panel of the image forming apparatus, the component which the user has replaced, when the component has been replaced. Upon receiving such a notification, the management server detects that a consumable component in the image forming apparatus has been replaced, and arranges for delivery of the component to a client using the image forming apparatus.

Further, in such a management system, the management server receives from the image forming apparatus notifications such as a low toner notification and an empty toner notification. The management server then monitors a remaining amount of a toner cartridge available as stock in a location of a client of the image forming apparatus (e.g., refer to Japanese Patent Application Laid-Open No. 2003-159854).

There is a demand in the above-described management system to perform stock management of a toner collection box in which used toner is collected after the image forming apparatus has performed printing. In such a case, the toner collection box should be managed as a replaceable component in the image forming apparatus.

Consumable components other than the toner collection box are consumed in each usage of the image forming apparatus, and are replaced after the user has confirmed a level of consumption based on the counter information. In contrast, the toner collection box is not consumed even when the image forming apparatus is used, so that the notifications on the counter information and replacement thereof are not issued to the management server.

SUMMARY OF THE INVENTION

An aspect of the present invention is directed to providing alarm information with respect to the toner collection box in a conventional management system, and provides a method for performing stock management of the toner collection box as a component in the image forming apparatus.

According to an aspect of the present invention, a management system includes an image forming apparatus and a management server that manages the image forming apparatus. The image forming apparatus includes a memory and a processor, connected to the memory, which is configured to control a transmission unit configured to transmit, to the management server, a notification indicating that one of specific components attached to the image forming apparatus has been replaced and a notification indicating that a toner collection box attached to the image forming apparatus is full or close to full. The management server includes a memory, and a processor, connected to the memory, which is configured to control a storing unit configured to store in a storage device stock information on each of the specific components and the toner collection box, a receiving unit configured to receive a notification from the image forming apparatus, and an updating unit configured to update stock information stored by the storing unit, wherein the updating unit updates, in a case where the notification received from the image forming apparatus indicates that the toner collection box is full or close to full, stock information of the toner collection box stored by the storing unit, and wherein the updating unit identifies, in a case where the notification received from the image forming apparatus indicates that one of the specific components has been replaced, a type of the one of the specific components based on a code included in the notification, and updates the stock information corresponding to the identified type.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates a component information table included in the management server.

FIG. 7 illustrates a filtering condition table included in the management server.

FIG. 9 is a flowchart illustrating alarm information reception processing performed by the management server.

FIG. 10 illustrates an example of a screen for specifying settings for performing stock management of a component, provided by the management server.

FIG. 11 illustrates an example of a screen for confirming a consumption rate of a component in the image forming apparatus, provided by the management server.

DESCRIPTION OF THE EMBODIMENTS

Various exemplary embodiments, features, and aspects of the invention will be described in detail below with reference to the drawings.

Figure 1:
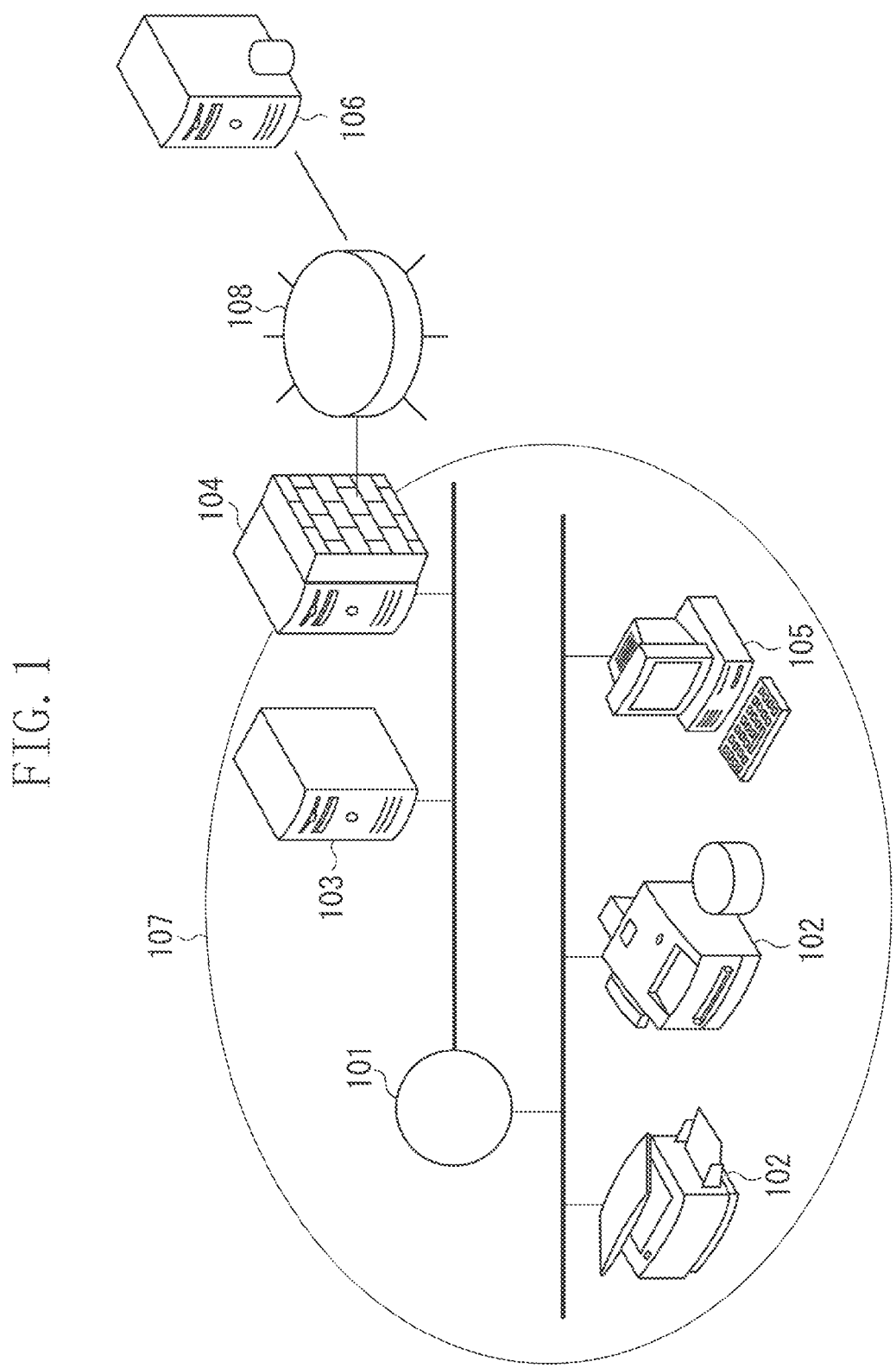
FIG. 1 illustrates an example of a network configuration according to an exemplary embodiment of the present invention.

FIG. 1 illustrates an example of a network configuration according to an exemplary embodiment of the present invention, and more specifically, a connection between an image forming apparatus and a management server via the Internet.

Referring to FIG. 1, an image forming apparatus 102, a proxy server 103, and a firewall 104 installed for enhancing security of an intranet are connected to one another via a local area network (LAN) 101. The image forming apparatus 102 may include functions such as a facsimile function and a copy function (not illustrated).

Further, a personal computer (PC) 105, which is used by a general user, and the above-described apparatuses are connected to one another via the LAN 101.

A management server 106, which collectively manages an operation status of the image forming apparatus, collects operation information, and arranges for maintenance when there is a failure in the image forming apparatus. Further, the management server 106 manages a stock status at a client location of consumable components in the image forming apparatus to be managed, and automatically arranges for delivery of new consumable components to the client location as necessary.

The image forming apparatus 102, the proxy server 103, and the firewall 104 are connected to one another via the LAN 101 in an intranet environment 107. A plurality of the intranet environments 107 and the management server 106 are connected to each other via the Internet 108.

The image forming apparatus 102 communicates via the LAN 101 according to a communication schedule thereof, and transmits to the management server 106 via the Internet 108 the operation information thereof (i.e., counter information, an operation status log, and failure information).

The counter information includes the number of sheets that have been printed in the image forming apparatus, and the number of times the component has been used which is managed for each component. The failure information includes a service call indicating that maintenance is necessary, and alarm information which is used in analyzing the failure.

Communication methods using the network include management information base (MIB) exchange via Simple Network Management Protocol (SNMP). According to the present exemplary embodiment, it is assumed that a communication protocol is Hypertext Transfer Protocol (HTTP) or HTTP over Secure Socket Layer (HTTPS). However, this is not a limitation, and in the example illustrated in FIG. 1, the image forming apparatus 102 uses HTTPS to transmit the information to the management server 106 via the proxy server 103 and the firewall 104.

Figure 2:
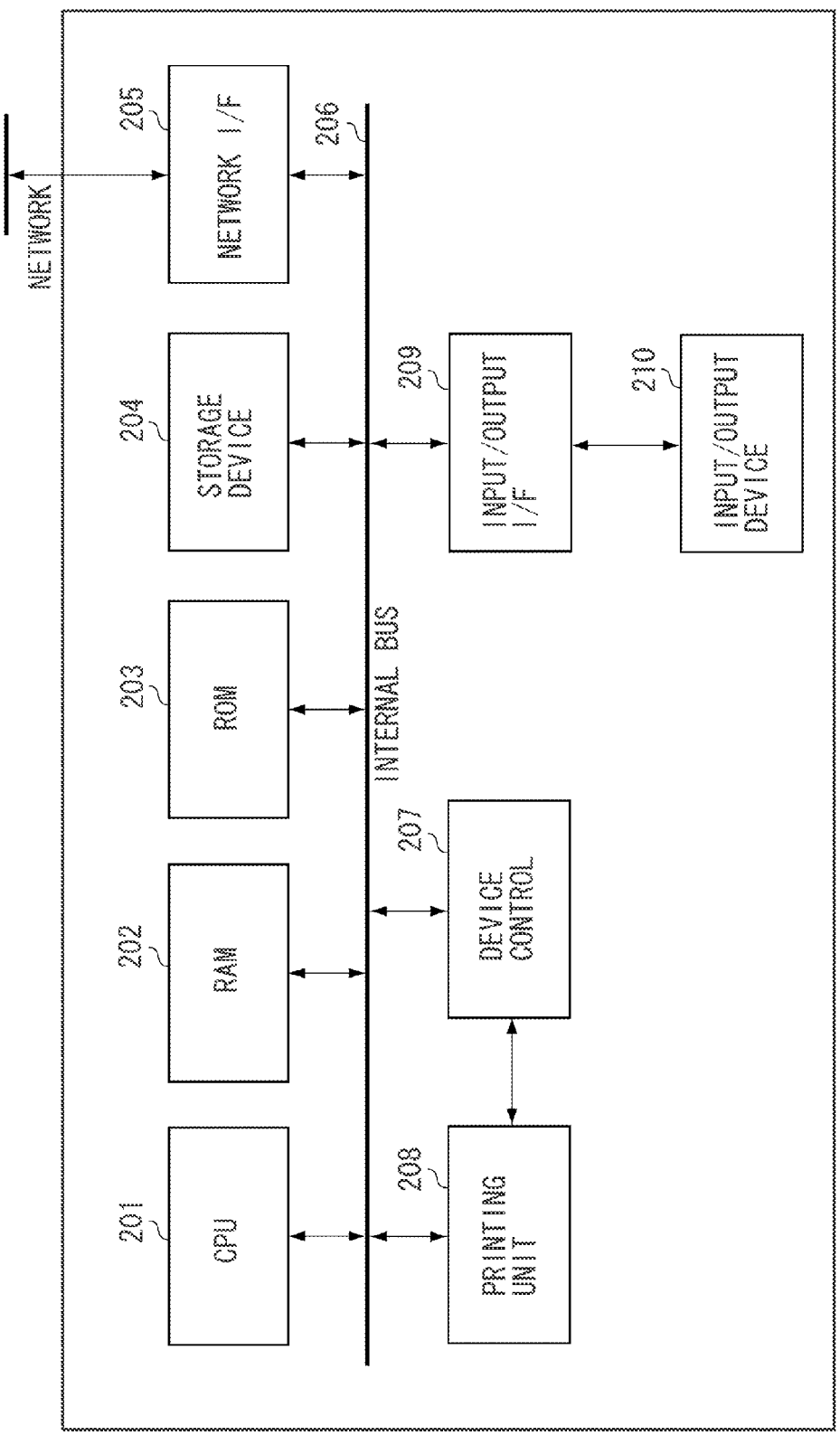
FIG. 2 illustrates a hardware configuration of an image forming apparatus according to an exemplary embodiment of the present invention.

FIG. 2 illustrates a hardware configuration of the image forming apparatus 102.

According to the present exemplary embodiment, it is assumed that the image forming apparatus 102 is an apparatus which forms and prints an image, such as a digital multifunction peripheral, a facsimile apparatus, or a laser beam printer.

Referring to FIG. 2, the image forming apparatus 102 includes a central processing unit (CPU) 201, a random access memory (RAM) 202, a read-only memory (ROM) 203, a storage device (i.e. a hard disk drive (HDD)) 204, a network interface (I/F) 205, an internal bus 206, a device control 207, and a printing unit 208. The printing unit 208 includes a fixing device (not illustrated) i.e., a component used in printing, which is attached to the printing unit 208 so that the user can detach the fixing device.

The CPU 201 includes programs (including programs for realizing each processing illustrated in FIG. 4 to be described below) stored in the ROM 203, and collectively controls each device via the internal bus 206. The RAM 202 functions as a memory and a work area of the CPU 201.

The network I/F 205 performs one-way or two-way exchange of data between an external network device via the LAN 101. The device control 207 controls the printing unit 208 according to a print request.

A toner collection box (not illustrated) in which used toner is collected after the image forming apparatus 102 performs printing is detachably attached to the printing unit 208 by the user. When the toner collection box becomes full, the used toner may be spilled inside the image forming apparatus 102, leading to deterioration of an output image or a failure in the image forming apparatus 102.

Accordingly, when the toner collection box becomes full or becomes close to full, the image forming apparatus 102 disables printing and issues a warning to prompt the user to replace the toner collection box.

The CPU 201 executes the programs along with the RAM 202 and the ROM 203, and also records image data in a recording medium such as the storage device 204. The storage device 204 functions as an external storage device, and stores the image data. Further, the storage device 204 can store the counter information and various logs instead of the backup RAM 202.

An input/output apparatus 210 receives an input (e.g., a scan or a button input) from the user, and notifies via an input/output I/F 209 each of the processing units of the input.

Figure 3:
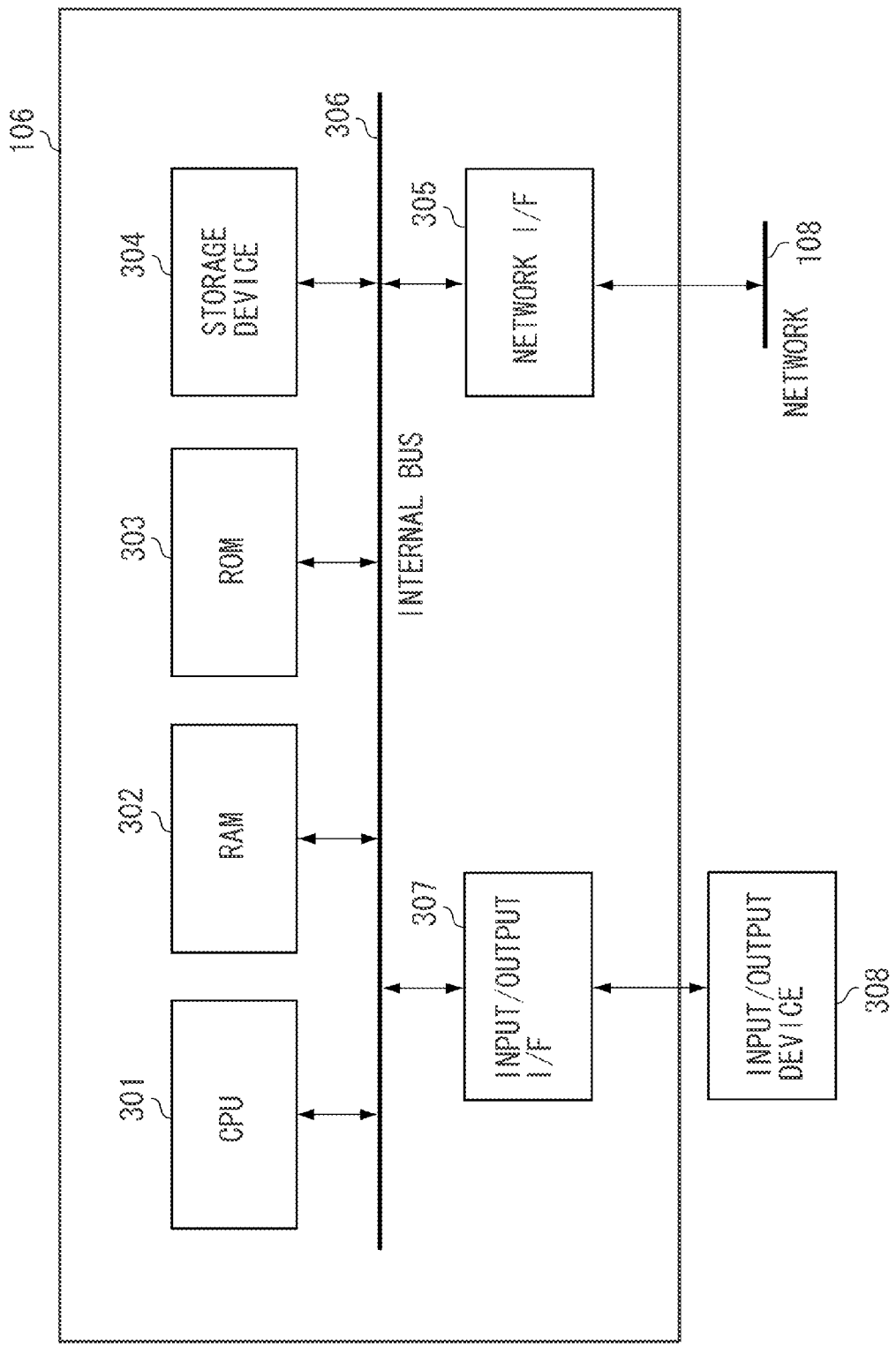
FIG. 3 illustrates a hardware configuration of a management server according to an exemplary embodiment of the present invention.

FIG. 3 illustrates a configuration of the management server 106 according to the present exemplary embodiment.

Referring to FIG. 3, the management server 106 includes a CPU 301 which executes the programs (including the programs for realizing processing illustrated in FIG. 5 to be described below) stored in a ROM 303. The CPU 301 controls each device via an internal bus 306.

A RAM 302, the ROM 303, a storage device (i.e., an HDD) 304, a network I/F 305, and an input/output I/F 307 are connected to the internal bus 306. Further, the input/output I/F 307 includes a Personal System (PS)/2 or a universal serial bus (USB) I/F, and an analog or a digital display I/F.

An input/output device 308 is an operation unit such as a keyboard, a cathode ray tube (CRT), or a liquid crystal display, which is capable of connecting to the management server 106 via the input/output I/F 307.

The management server 106 uses the network I/F 305 to connect to the Internet (network) 108 via the LAN 101 and the intranet environment 107, and can thus communicate with the image forming apparatus 102 and the PC 105. By performing such communication, the management server 106 can collect the operation information of the image forming apparatus 102.

The CPU 301 executes the programs along with the RAM 302 and the ROM 303. Further, the CPU 301 records the image data in the recording medium such as the storage device 304. The storage device 304, which functions as an external storage device, stores the operation information of the image forming apparatus 102, and is also capable of storing system information and processing information instead of the backup RAM 302.

Figure 4:
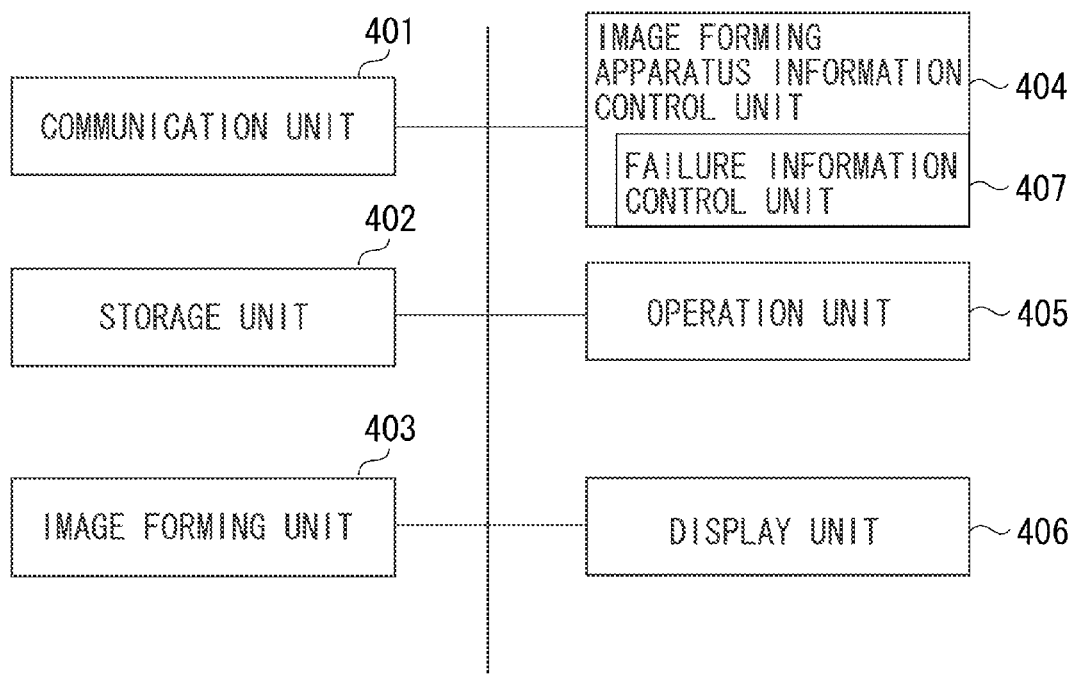
FIG. 4 illustrates a software configuration of the image forming apparatus.

FIG. 4 illustrates an example of a software module configuration of the image forming apparatus 102.

Referring to FIG. 4, the image forming apparatus 102 includes a communication unit 401, a storage unit 402, an image forming unit 403, an image forming apparatus information control unit 404, an operation unit 405, a display unit 406, and a failure information control unit 407 in the image forming apparatus information control unit 404.

The communication unit 401 transmits to the management server 106 image forming apparatus information (i.e., device information) of the image forming apparatus 102. The device information includes identification information (i.e., a serial number), network information (i.e., an internet protocol (IP) address), and the operation information of the image forming apparatus. Further, the communication unit 401 receives instructions and setting data transmitted from the management server 106. The communication unit 401 transmits and receives the instructions and the data using simple mail transfer protocol (SMTP) and HTTP/HTTPS.

The storage unit 402 performs storage control, such as storing and reading information in and from the RAM 202, the ROM 203, and the storage device 204 illustrated in FIG. 2. Further, the storage unit 402 stores history information (i.e., log data) indicating operation history and various abnormal states of the image forming apparatus 102. Furthermore, the storage unit 402 stores the above-described device information and the information on the management server (i.e., server information). The server information includes information used in communication, such as address information of the management server 106 managing the image forming apparatus 102.

The image forming unit 403 includes a function for generating and outputting print data to be transmitted to the printing unit 208. The image forming apparatus information control unit (i.e., device information control unit) 404 performs print control and manages the abnormal state of the image forming apparatus 102, and also manages the counter information and notification information of the image forming apparatus 102. Further, the image forming apparatus information control unit 404 performs control of color adjustment, a print mode, and other function-settings.

The operation unit 405 is an interface which allows the user to issue operation instructions, such as a print instruction, to the image forming apparatus 102. The display unit 406 displays the appropriate information to the user. Display contents of the display unit 406 include status information and setting information of the image forming apparatus.

The failure information control unit 407 in the image forming apparatus information control unit 404 generates, when a failure occurs in the image forming apparatus 102, the failure information to be transmitted to the management server 106.

Figure 5:
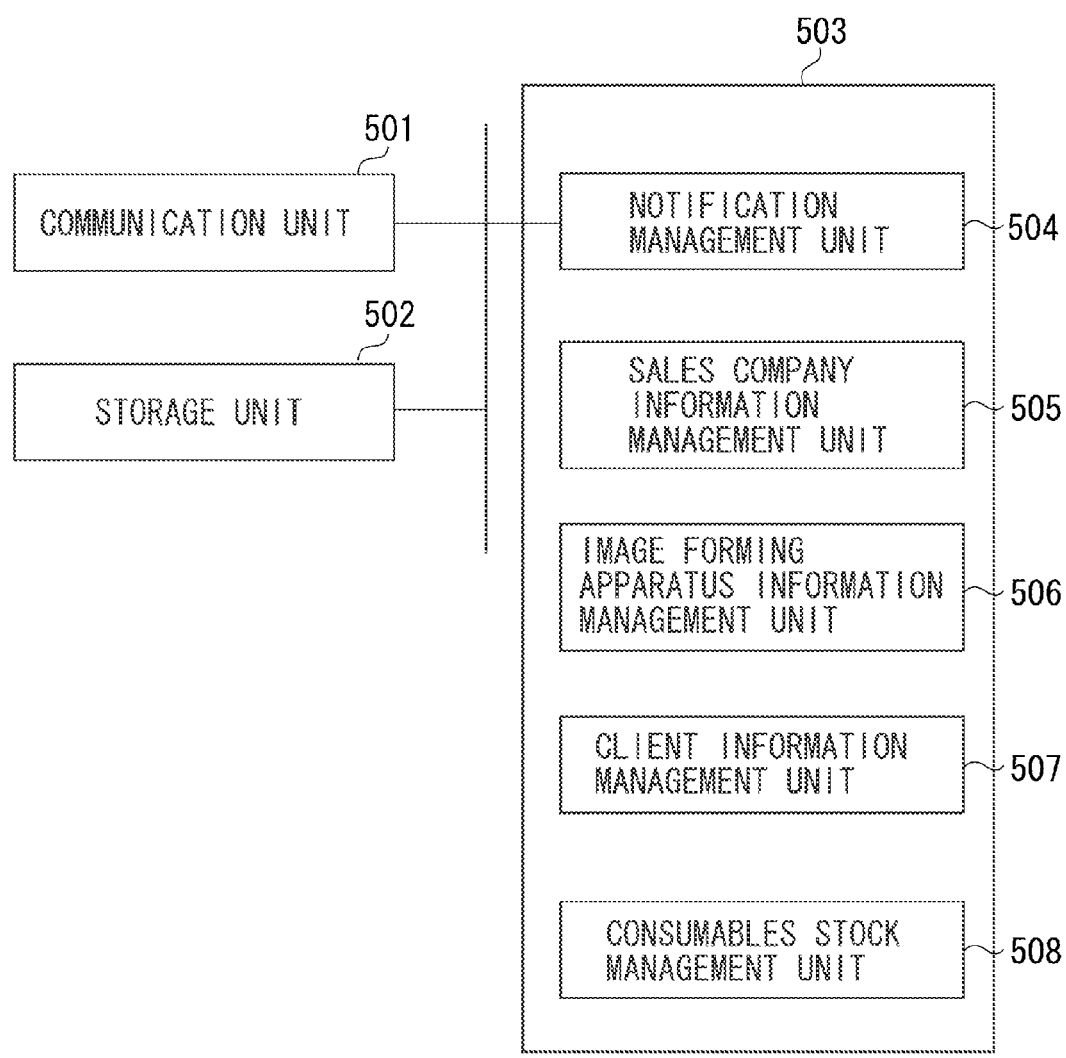
FIG. 5 illustrates a software configuration of the management server.

FIG. 5 illustrates a software module configuration of the management server 106 according to the present exemplary embodiment.

Referring to FIG. 5, the management server 106 includes a communication unit 501, a storage unit 502, and a management unit 503.

The communication unit 501 includes a function for communicating with the image forming apparatus 102. The communication unit 501 receives the device information transmitted from the image forming apparatus 102, and transmits to the image forming apparatus 102 the instruction on the communication schedule, various settings, and information necessary for performing maintenance.

The storage unit 502 performs information storage control with respect to the RAM 302, the ROM 303, and the storage device 304. According to the present exemplary embodiment, the storage unit 502 performs storage control of the device information, sales company information, and client information.

The management unit 503 monitors the image forming apparatus 102 and includes the functions for managing the information necessary for performing maintenance. The management unit 503 thus includes a notification management unit 504, a sales company information management unit 505, an image forming apparatus information management unit 506, a client information management unit 507, and a consumables stock management unit 508.

The notification management unit 504 designates the content of a notification and a destination thereof, and generates the notification information. The types of notification include a maintenance request notification issued to a system (not illustrated) that arranges for service personnel to maintain the image forming apparatus 102, and a consumables-replenishment request notification.

The sales company information management unit 505 manages information on a sales company that manages and supports the image forming apparatus 102 installed in the client location. The image forming apparatus information management unit 506 manages the device information of the image forming apparatus 102 to be maintained. The image forming apparatus information management unit 506 manages the information such as the identification information, the status information including the abnormal state, maintenance history, administrator information, and consumables management information of the image forming apparatus 102.

The client information management unit 507 manages the information on a client who has installed the image forming apparatus 102. The information includes the identification information of the image forming apparatus used by the client, and information on a maintenance agreement between the client and the sales company.

The consumables stock management unit 508 manages a stock amount of a component, such as a toner cartridge and the fixing device, which are replaceable in the image forming apparatus 102, and the toner collection box, which is usable by the client. The consumables stock management unit 508 manages the stock amount as stock information, associated with the client information.

When the management server 106 receives, from the image forming apparatus 102, a notification indicating that the client has used the stock for replacing a component, the management server 106 updates the stock information, i.e., decreases the stock amount. Further, if the stock amount usable by the client becomes small, the management server 106 generates a message requesting an automatic delivery, and instructs transmission of the message to the sales company via the communication unit 501.

FIG. 6 illustrates an example of a management table of component information managed by the management server 106 (i.e., master information of the components). Such information is stored in the storage device 304 in the management server 106.

Referring to FIG. 6, a "component primary number" column indicates primary numbers of each component, which are assigned to uniquely identify each component in the management server 106. A "component code" column indicates codes directly assigned to each component. A "component name" column indicates names of each component. According to the example illustrated in FIG. 6, the toner collection box is added as a component.

A "component management flag" is for designating a type of a processing method (e.g., consumption rate calculation and subtraction processing in stock management), with respect to component management, to be applied to each component when performing stock management. If there is a component in which neither "R" or "O" is entered in the "component management flag" column, stock management of the component cannot be performed.

A "stock management flag" is for indicating whether there is an agreement between the client and the sales company (or a maintenance company) on stock management for each component. Such a flag is used to determine whether the management server 106 is to perform stock management of the component. The stock management flag can be set on a screen illustrated in FIG. 10 as described below.

FIG. 7 is an example of a management table of filtering conditions of each type of alarm included in the management server 106.

The information on the filtering condition is stored in the storage device 304 in the management server 106. The filtering condition indicates a condition for determining the alarm information received from the image forming apparatus 102, which the management server 106 is to discard without storing.

It is assumed that the alarm information includes an alarm code, a sub-code, information on a date and time the alarm is generated, and the counter information (e.g., a counter value indicating a total number of sheets printed in the apparatus).

Referring to FIG. 7, various types of the alarm information on which filtering is to be performed is registered in a first column. The conditions used in performing the filtering processing are indicated in a first row. Threshold values with which a difference between the dates and times at which the previous alarm information and the current alarm information are generated, and a difference between counter values are to be compared, are previously set in the table as the conditions.

For example, if a toner collection box full alarm is received within three days from the previously generated date and time, and the difference between counter values is within 1000 sheets, the filter condition is satisfied. In such a case, the management server 106 discards the newly received alarm information. The toner collection box full alarm is the notification on a detection result of a sensor installed in the image forming apparatus, indicating that the toner collection box is full or close to full.

It is assumed that the components related to the alarm information managed in the table illustrated in FIG. 7 are targets of stock management. Upon receiving the alarm information notification, the management server 106 determines that the client has replaced the component, and updates the stock information managed therein. The management server 106 thus performs the filtering processing to prevent, if the alarm information notification is generated due to false detection by the sensor in the image forming apparatus when the user replaces the component, erroneous updating of the stock information.

Figure 8:
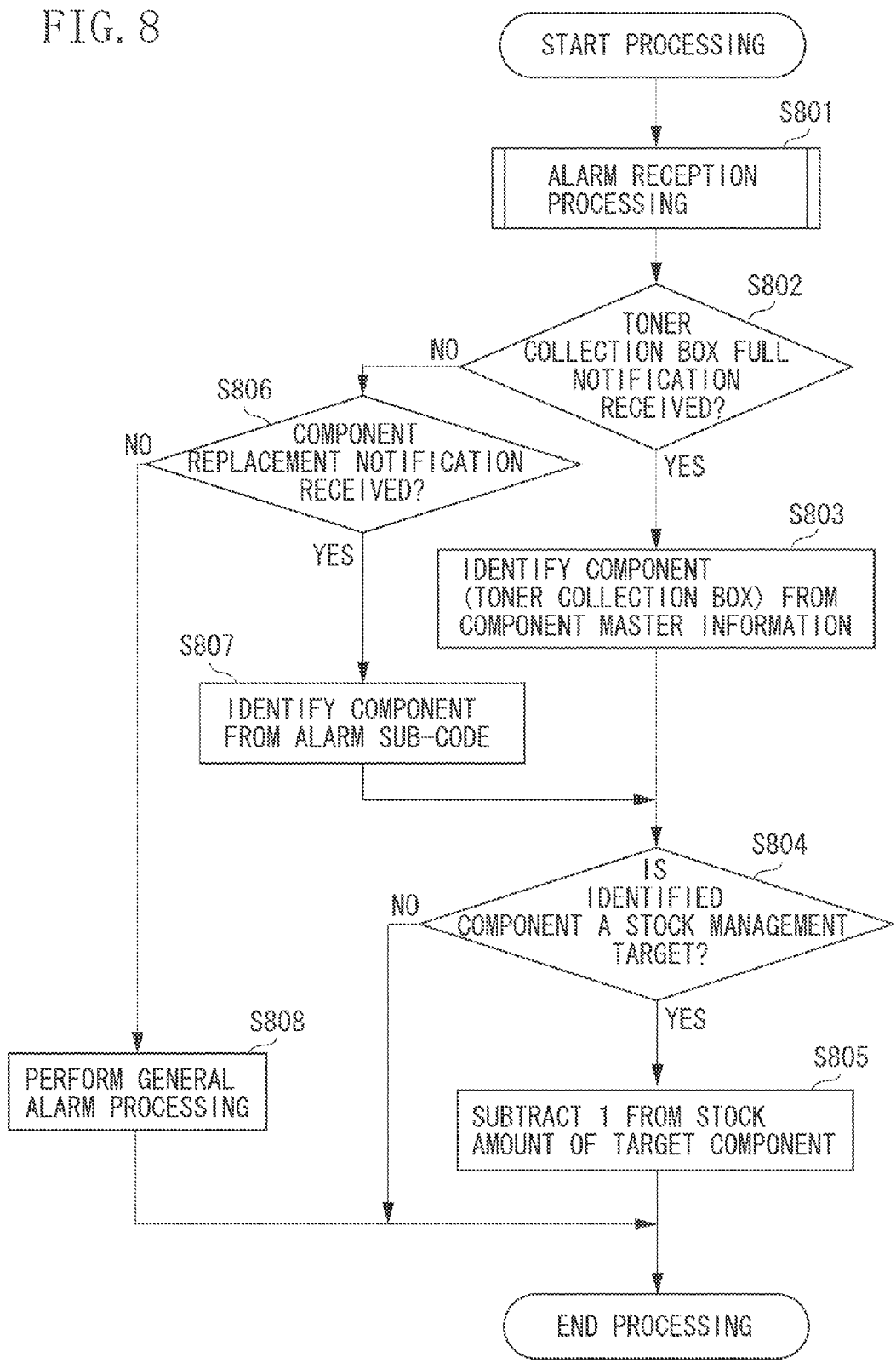
FIG. 8 is a flowchart illustrating stock information updating processing performed by the management server.

FIG. 8 is an example of a flowchart illustrating processing for updating the stock information when the management server 106 has received the alarm information from the image forming apparatus 102.

In step S801, the management server 106 receives the alarm information transmitted from the image forming apparatus 102. The processing performed in step S801 is described in detail below with reference to FIG. 9. If the alarm information has been discarded in the receiving processing performed in step S801, the subsequent processing is omitted, and the processing illustrated in FIG. 8 ends.

In step S802, the management server 106 determines, based on the alarm code in the alarm information, whether the toner collection box full notification is received. If the received alarm information is the toner collection box full notification (YES in step S802), the processing proceeds to step S803. In step S803, the management server 106 refers to the master information of the components (i.e., the table illustrated in FIG. 6), and identifies the component corresponding to the alarm information (i.e., the toner collection box). More specifically, the management server 106 refers to the component management flag in the table illustrated in FIG. 6, and identifies that the component is the toner collection box.

According to the present exemplary embodiment, management is performed so that the component corresponding to the toner collection box full notification is identified by the component management flag "R". As a result, the toner collection box is identified as the component corresponding to the toner collection box full notification. Further, there is only one component in each product whose component management flag becomes "R" (i.e., there is one type of toner collection box for one product).

In step S804, the management server 106 determines whether there is a component among the components identified in step S803 which is a stock management target. More specifically, the management server 106 refers to the stock management flag in the table illustrated in FIG. 6 and determines whether the component is a stock management target. If the component is a stock management target (YES in step S804), the processing proceeds to step S805. In step S805, the management server 106 determines that the component has been replaced and the stock has been used. The management server 106 thus subtracts "1" from the stock amount of the component, managed as the stock information in the component stock management unit 508 illustrated in FIG. 5. The processing illustrated in FIG. 8 then ends.

The client information to be reduced can be identified by inquiring the client information management unit 507 illustrated in FIG. 5, using the identification information of the image forming apparatus included in the alarm information. If the component is not a stock management target (NO in step S804), the processing ends.

If the received alarm information is not the toner collection box full notification (NO in step S802), the processing proceeds to step S806. In step S806, the management server 106 determines whether the received alarm information is a component replacement notification based on the alarm code in the received alarm information. Upon replacing the replaceable component with a new component, the user of the image forming apparatus 102, inputs via the operation unit 405 that the replaced component has been selected and replaced. The image forming apparatus 102 then issues the component replacement notification.

Since the sensor does not automatically detect that the component has been replaced, as in the case of the toner collection box full notification, false detection does not occur. It is thus not necessary for the management server 106 to perform the filtering processing using the conditions illustrated in FIG. 7. Further, the component replacement notification includes, as the sub-code, information by which the type of the replaced component (i.e., a component code) selected by the user can be identified, which is also different from the toner collection box full notification.

If the received alarm information is the component replacement notification (YES in step S806), the processing proceeds to step S807. In step S807, the management server 106 identifies the component based on the received alarm information. More specifically, the sub-code of the alarm code included in the received alarm information is the component code. The management server 106 can thus identify the component corresponding to the alarm information by referring to the master information of the components (i.e., the table illustrated in FIG. 6). The management server 106 then performs the processing of step S804 and the subsequent steps.

If the received alarm information is not the component replacement notification (NO in step S806), the processing proceeds to step S808. In step S808, the management server 106 performs processing for a general alarm, and the processing illustrated in FIG. 8 ends. The management server 106 performs processing for the general alarms as follows. The management server 106 stores the alarm information in a predetermined storage device, and uses the stored alarm information to issue a notification or analyze a failure with respect to the image forming apparatus which has transmitted the alarm information. A detailed description of the processing is omitted herein.

FIG. 9 is an example of a flowchart illustrating alarm reception processing (i.e., step S801 illustrated in FIG. 8) performed by the management server 106.

The management server 106 receives the alarm information transmitted from the image forming apparatus 102. In step S1401, the management server 106 then determines whether the received alarm information is to be filtered, based on whether the type of the received alarm information is registered in the table illustrated in FIG. 7. The types of the alarm information that are to be filtered include the toner collection box full notification and a staple run-out notification.

If the received alarm information is to be filtered (YES in step S1401), the processing proceeds to step S1402. On the other hand, if the received alarm information is not to be filtered (NO in step S1401), the alarm reception processing ends, and the processing returns to the flowchart illustrated in FIG. 8.

In step S1402, the management server 106 determines whether the received alarm information matches the filtering condition. The filtering condition includes a condition that the newly received alarm information has been received within a predetermined time from when the same type of alarm information had previously been received. Further, the filtering condition includes a condition that the value of the counter information of the image forming apparatus 102 included in the newly received alarm information is within a predetermined number of sheets from the value of the counter information of the image forming apparatus 102 included in the same type of alarm information that had previously been received. Such a condition is set for confirming whether the image forming apparatus has been sufficiently performing a normal operation after receiving the previous alarm information. If the received alarm information satisfies the filtering condition, it indicates that the image forming apparatus 102 may not have been sufficiently performing the normal operation after receiving the previous alarm information. It can thus be determined that the newly received alarm information is a false detection by the image forming apparatus 102. If the received alarm information matches the filtering condition (YES in step S1402), the processing proceeds to step S1403. In step S1403, the management server 106 discards the received alarm information without storing in the storage device 304. If the received alarm information does not match the filtering condition (NO in step S1402), the alarm reception processing ends, and the processing returns to the flowchart illustrated in FIG. 8.

FIG. 10 illustrates a screen 1001 of a web site provided by the management server 106, which is an example of a screen for performing stock management setting of the components.

Referring to FIG. 10, a component list 1002 displays components that are stock management targets. The component management flag (indicated in the table illustrated in FIG. 6) of the components displayed in the component list 1002 is either "R" or "O". There is a check box on the screen for each component, and if the user checks the check box, the component becomes a stock management target, and the stock management flag in the management table illustrated in FIG. 6 then becomes "1". FIG. 10 illustrates an example in which the toner collection box is set as a stock management target.

FIG. 11 illustrates a screen 1101 of the web site provided by the management server 106, which is an example of a screen for confirming a consumption rate of the component in the image forming apparatus 102.

Referring to FIG. 11, the screen 1101 displays a consumption rate of each component with respect to a component life. More specifically, a level of consumption of each component is calculated based on the value of a parts counter transmitted from the image forming apparatus 102 and displayed as the consumption rate.

In the example illustrated in FIG. 11, the toner collection box is managed in the management server 106 as a component to which the component code is assigned as indicated in the table illustrated in FIG. 6. However, the toner collection box itself is not consumed even when used, and it is not necessary to manage the toner collection box using the counter. The data on the toner collection box is thus omitted in the screen for confirming the consumption rate illustrated in FIG. 11.

The image forming apparatus 102 may display the above-described confirmation screen. In such a case, the management server 106 generates the screen information, and the image forming apparatus 102 may display the screen. Further, the image forming apparatus 102 itself may generate a similar screen from component type information and the counter information managed thereby.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-140882 filed Jun. 24, 2011, which is hereby incorporated by reference herein in its entirety.

What is claimed is:

1. A management system comprising:
an image forming apparatus; and
a management server that manages the image forming apparatus,
the image forming apparatus comprising:
a memory,
and a processor, connected to the memory, the processor configured to control:
a transmission unit configured to transmit, to the management server, a notification indicating that one of specific components attached to the image forming apparatus has been replaced and a notification indicating that a toner collection box attached to the image forming apparatus is full or close to full, and
the management server comprising:
a memory, and a processor, connected to the memory, the processor configured to control:
a storing unit configured to store in a storage device stock information on each of the specific components and the toner collection box,
a receiving unit configured to receive a notification from the image forming apparatus, and
an updating unit configured to update stock information stored by the storing unit,
wherein the updating unit updates, in a case where the notification received from the image forming apparatus indicates that the toner collection box is full or close to full, stock information of the toner collection box stored by the storing unit, and
wherein the updating unit identifies, in a case where the notification received from the image forming apparatus indicates that one of the specific components has been replaced, a type of the one of the specific components based on a code included in the notification, and updates the stock information corresponding to the identified type,
wherein the management server acquires at least one of differences between at least one of information on date and counter information included in a newly received notification indicating that the toner collection box is full or close to full and corresponding information included in a previously received notification indicating that the toner collection box is full or close to full, and
wherein, in a case where the difference is less than a corresponding threshold value, the newly received notification is not used for updating the stock information by the updating unit.

2. The management system according to claim 1, wherein the image forming apparatus transmits to the management server the notification indicating that one of the specific components has been replaced and the notification indicating that the toner collection box is full or close to full as alarm information.

3. The management system according to claim 1, wherein the management server receives, from the image forming apparatus, counter information of the specific components,
wherein the processor of the management server is further configured to control a providing unit configured to provide, using the received counter information, a screen used for checking each level of consumption of the specific components.

4. A method for a management system including an image forming apparatus and a management server that manages the image forming apparatus, the method comprising:
transmitting, to the management server, a notification indicating that one of specific components attached to the image forming apparatus has been replaced and a notification indicating that a toner collection box attached to the image forming apparatus is full or close to full;
storing stock information on each of the specific components and the toner collection box;
receiving a notification from the image forming apparatus;
updating, in a case where the notification received from the image forming apparatus indicates that the toner collection box is full or close to full, the stored stock information of the toner collection box;
identifying, in a case where the notification received from the image forming apparatus indicates that one of the specific components has been replaced, a type of the one of the specific components based on a code included in the notification, and updating the stock information corresponding to the identified type; and
acquiring at least one of differences between at least one of information on date and counter information included in a newly received notification indicating that the toner collection box is full or close to full and corresponding information included in a previously received notification indicating that the toner collection box is full or close to full, and
wherein, in a case where the difference is less than a corresponding threshold value, the newly received notification is not used for updating the stock information.

5. A management server connected to an image forming apparatus that transmits thereto a notification indicating that one of specific components attached to the image forming apparatus has been replaced and a notification indicating that a toner collection box attached to the image forming apparatus is full or close to full, the management server comprising:
a memory; and
a processor, connected to the memory, the processor configured to control:
a storing unit configured to store stock information on each of the specific components and the toner collection box in a storage device;
a receiving unit configured to receive a notification from the image forming apparatus; and
an updating unit configured to update stock information stored by the storing unit,
wherein the updating unit updates, in a case where the notification received from the image forming apparatus indicates that the toner collection box is full or close to full, the stock information of the toner collection box stored by the storing unit, and
wherein the updating unit identifies, in a case where the notification received from the image forming apparatus indicates that one of the specific components has been replaced, a type of the one of the specific components based on a code included in the notification, and updates the stock information corresponding to the identified type,
wherein the management server acquires at least one of differences between at least one of information on date and counter information included in a newly received notification indicating that the toner collection box is full or close to full and corresponding information included in a previously received notification indicating that the toner collection box is full or close to full, and
wherein, in a case where the difference is less than a corresponding threshold value, the newly received notification is not used for updating the stock information by the updating unit.

6. The management server according to claim 5, wherein the management server receives the notification indicating that one of the specific components has been replaced and the notification indicating that the toner collection box is full or close to full as alarm information.

7. The management server according to claim 5, wherein the management server receives, from the image forming apparatus, counter information of the specific components,
wherein the processor of the management server is further configured to control a providing unit configured to provide, using the received counter information, a screen used for checking each level of consumption of the specific components without including information on the toner collection box.

8. A method for a management server connected to an image forming apparatus that transmits thereto a notification indicating that one of specific components attached to the image forming apparatus has been replaced and a notification indicating that a toner collection box attached to the image forming apparatus is full or close to full, the method comprising:
- storing stock information on each of the specific components and the toner collection box in the image forming apparatus;
- receiving a notification from the image forming apparatus;
- updating, in a case where the received notification indicates that the toner collection box is full or close to full, the stored stock information of the toner collection box;
- identifying, in a case where the received notification indicates that one of the specific components has been replaced, a type of one of the specific components based on a code included in the received notification, and updating the stock information corresponding to the identified type;
- acquiring at least one of differences between at least one of information on date and counter information included in a newly received notification indicating that the toner collection box is full or close to full and corresponding information included in a previously received notification indicating that the toner collection box is full or close to full, and
- wherein, in a case where the difference is less than a corresponding threshold value, the newly received notification is not used for updating the stock information.

9. A non-transitory computer-readable storage medium storing a computer program that causes a computer to execute a method for a management server connected to an image forming apparatus that transmits thereto a notification indicating that one of specific components attached to the image forming apparatus has been replaced and a notification indicating that a toner collection box attached to the image forming apparatus is full or close to full, the method comprising:
- storing stock information on each of the specific components and the toner collection box in the image forming apparatus;
- receiving a notification from the image forming apparatus;
- updating, in a case where the received notification indicates that the toner collection box is full or close to full, the stored stock information of the toner collection box;
- identifying, in a case where the received notification indicates that one of the specific components has been replaced, a type of the one of the specific component based on a code included in the received notification, and updating the stock information corresponding to the identified type; and
- acquiring at least one of differences between at least one of information on date and counter information included in a newly received notification indicating that the toner collection box is full or close to full and corresponding information included in a previously received notification indicating that the toner collection box is full or close to full, and
- wherein, in a case where the difference is less than a corresponding threshold value, the newly received notification is not used for updating the stock information.

* * * * *